July 15, 1958 A. T. SAYRE, JR., ET AL 2,842,958
APPARATUS FOR MEASURING FLOW CHARACTERISTICS OF
POROUS SPECIMENS BY DISPLACEMENT
Filed Jan. 27, 1956

INVENTORS.
ALLYN T. SAYRE JR.
DON W. ROARK
ALBERT H. ARENS
DON J. WANGELIN
BY
Edward H. Long
ATTORNEY United States Patent Office 2,842,958
Patented July 15, 1958

2,842,958

APPARATUS FOR MEASURING FLOW CHARACTERISTICS OF POROUS SPECIMENS BY DISPLACEMENT

Allyn T. Sayre, Jr., Don W. Roark, and Albert H. Arens, Crystal Lake, and Don J. Wangelin, Barrington, Ill., assignors to The Pure Oil Company, Chicago, Ill., a corporation of Ohio Application January 27, 1956, Serial No. 561,708

4 Claims. (Cl. 73—38)

This invention relates to the measurement of characteristics of porous materials, such as cores from a well bore, and refers more particularly to an apparatus for making displacement studies, including the measurement of effective, specific, or relative permeabilities, and the like of rocks, sands, cores and other porous earth formation specimens to the flow of fluids such as oil, water and gas.

The solution of many of the important production problems relative to secondary recovery, pressure maintenance and proper evaluation of recoverable reserves depends upon full knowledge of the flow characteristics of rock strata containing oil, water, and/or gas. To make such studies it is highly desirable that the results obtained truly reflect the actual flow conditions within the earth strata. As a result, apparatuses have been developed for holding and sealing cores so that fluids may be forced therethrough at high pressures and elevated temperatures. Various means have been used to obtain an effective seal around the peripheral surface of the core so that the best results can be obtained. For this purpose, it has been the practice to place the core in a sleeve of flexible, impervious material of such size that the ends thereof extend beyond the end of the core. A seal is then effected by clamping the extending ends of the sleeve between cup-shaped body parts of the apparatus. These flexible sleeves are subjected to extended periods of high heat and pressure, and similar adverse conditions including deterioration by oil, and as a result, they tend to crack and disintegrate causing leaks in the system. Furthermore, these prior art devices depend upon a direct impingment of the body parts with the wall of the flexible sleeve in such a manner that tensive forces are established which accelerate the breakdown of the flexible material. This invention is directed to an apparatus of this type, but employs a flexible sleeve wherein a partial compressive force is placed on the flexible sleeve ends, instead of a tensive or stretching force, whereby the life of the sleeve is prolonged and a good seal around the core is assured.

Briefly, the apparatus comprises frustro-conical end-plugs held by means of pressure plates against the inside surfaces of the extending ends of a flexible, core-encasing sleeve and depending upon opposed, conical apertures in a housing whereby the extended ends of the flexible sleeve are pressed between opposed, parallel, substantially conical surfaces to form a seal.

Accordingly, the first object of the invention is to provide an apparatus for studying the fluid flow characteristics of porous specimens employing a flexible sleeve whereby a good and lasting seal against high pressures, temperatures and deteriorating conditions is obtained.

Another object is to provide an apparatus for measuring the flow characteristics of porous specimens by displacement wherein a compressive and protective seal between opposed, flexible and non-flexible, sealing surfaces is obtained.

A further object is to provide in a displacement- or permeability-measuring apparatus, cooperating, opposed, tapered, rigid sealing surfaces on each side of flexible, pressure-sealing surfaces.

Further objects and advantages of the invention will be apparent as the description thereof proceeds.

The invention is best understood by reference to the drawings representing the preferred embodiments of the invention in which.

Figure 1:
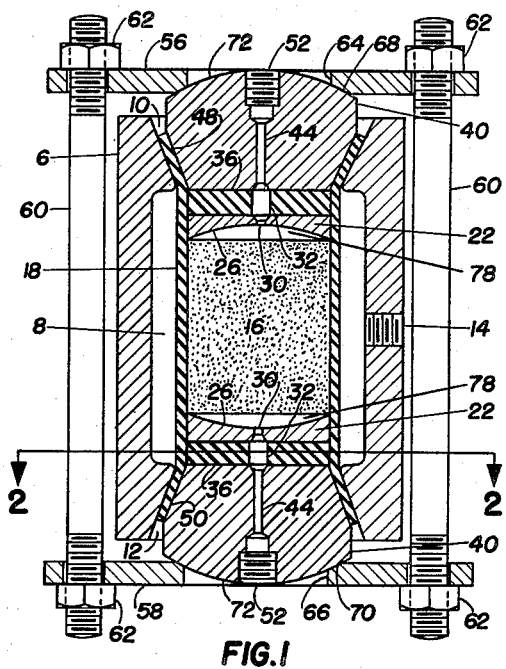
Figure 1 is a vertical section through the center of the apparatus showing the general arrangement of the parts surrounding and holding a core specimen.

Referring to the drawings, particularly Figure 1, the numeral 6 indicates a cylindrical housing forming core sample-chamber 8. Housing 6 has conical-shaped openings 10 and 12 at opposite ends thereof. Housing 6 is provided with side-port or opening 14 leading to chamber 8. Opening 14 is preferably internally threaded to provide means for attaching suitable lines for conveying high pressure fluids into or from chamber 8. The core specimen indicated by 16 is held in place by fluid-impermeable flexible sleeve 18. Sleeve 18 is cylindrical in shape when not in position within the apparatus. The ends of sleeve 18 extend beyond core 16 into openings 10 and 12 of housing 6. Slotted discs 22 are shown at opposite ends of core 16. The discs 22 are provided with apertures 30, having chamfered edges on the sides away from core 16. This provides a passage of fluids into or from a matching pair of apertures, 32, of a second pair of flat filler discs, or washers, 36. End-plugs 40, provided with passages 44, act as retainers to hold the filler discs and slotted discs firmly in place, and have external frustro-conical sealing surfaces 48 and 50 which press against the extending ends of sleeve 18 to seal same against the internal, conical, sealing surfaces of apertures 10 and 12 of housing 6. The external conical surfaces, 48 and 50, of the end-plugs are smoothly machined at the same angle as the internal sealing surfaces of apertures 10 and 12 of housing 6 so that the extending ends of sleeve 18 are pressed therebetween in a tight and lasting seal. End-plugs 40 have threaded recesses 52 connecting to passageways 44.

End-plugs 40 are held in place by plates 56 and 58 through stud bolts 60 and nuts 62. Plates 56 and 58 are provided with apertures 64 and 66 having chamfered or spherical surfaces 68 and 70 which press against the spherical top surfaces, 72, of the end-plugs. This arrangement has been found to greatly facilitate mounting and demounting the core specimens in the holder and maintaining uniform, equal pressure at the sealing surfaces.

Figure 3:
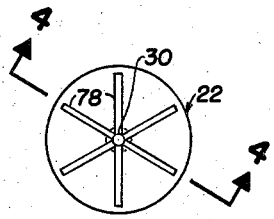
Figure 3 is a plan view taken on the slotted side of one of the metal discs adjacent the core ends, showing the intersecting slots therein.
Figure 4:
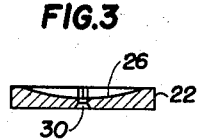
Figure 4 is a cross-section taken along lines 4—4 of Figure 3.
Figure 2:
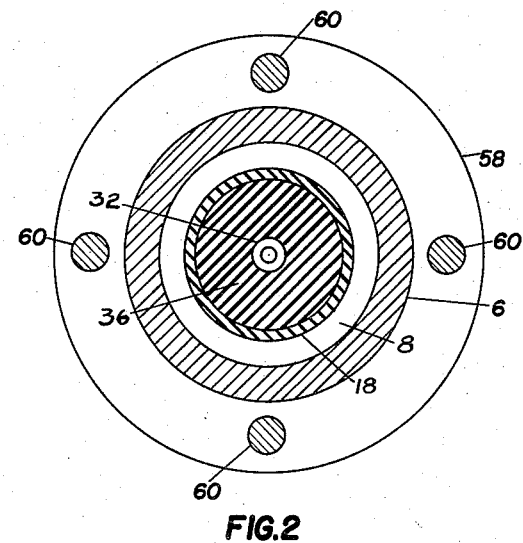
Figure 2 is a horizontal cross-section taken along line 2—2 of Figure 1.

Figure 2, a cross-section along lines 2—2 of Figure 1, shows the general relationship of disc 36, sleeve 18, and annular space or chamber 8 with housing 6 and plate 58. Figures 3 and 4 show the details of one of the slotted discs 22 in which slots 78 are shown, with concave bottom portions 26, extending radially from the center aperture 30. Slots 78 are machined only part-way into the flat surface of discs 22, and provide for the uniform injection of fluids, passing through aperture 30, across the face of core specimen 16 or the uniform gathering of fluids that have passed through the core. Since the core specimens are cut with a diamond drill from the earth formations, they are generally cylindrical in cross-section and vary in length from several inches to several feet. In making fluid-flow measurements of the cores, it is customary to cut these long cores into short lengths with a diamond saw so that the specimens have substantially flat, parallel tops and bottoms. Some cores are irregular in shape and one advantage of the sleeve arrangement is that small irregularities in the core shape do not interfere with fluid-flow measurements. Obviously misshapen, deformed, or broken cores cannot be used in the apparatus.

Figure 5:
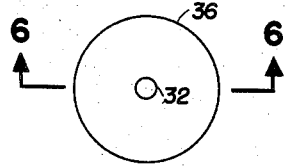
Figure 5 is a top, plan view of one of the flexible washers used in the apparatus.
Figure 6:
Figure 6 is a cross-section of the washer shown in Figure 5, taken along line 6—6.
Figure 7:
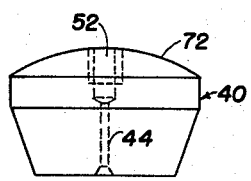
Figure 7 is a side view of one of the end-plugs used in the apparatus.

The details of flat filler-discs 36 are shown in Figures 5 and 6. These discs are made of a pliant material, which like sleeve 18 is resistant to heat and the fluids used in and near the core holder. In Figure 7 the details of end-plugs 40 are shown.

Because of the simplicity of construction, the present apparatus is easy to maintain and keep clean. In assembling the apparatus, the core specimen is first placed in the flexible sleeve, and discs 22, followed by filler discs 36, are inserted. This assembly is placed in the housing and the end-plugs are forced by hand into the extending ends of sleeve 18. Next, the assembly is placed upon an end-plate and the top end-plate is put into position on the studs. The nuts are screwed on evenly until the plugs are squarely and firmly seated. The various conduits, pumping equipment and pressure measuring devices are attached, and, after hydraulic pressure in chamber 8 has been raised to above the test pressure to be used, the apparatus is ready for use.

The core specimen will have occluded fluids within its porous structure and air will be present in slots 78 and in the passageways. To prevent any interference of these occluded fluids and air with the fluid-flow results obtained by the apparatus, it has been found convenient to flush out the slots (78) and the passageways before pressure is applied in chamber 8. This prevents the air from being forced into the core and uniform results are obtained. In general, the pressure in annulus 8 is maintained 100 to 250 pounds per square inch higher than the pressure of fluids passing through passageways 44, 32 and 30, and through the core. The working pressure of the apparatus is about 1000 to 2000 pounds per square inch. The rate of passage of fluids through the core varies from about 0.1 foot per second to 10 feet per second, depending on the permeability of the core. Various test fluids, either gaseous or liquid, may be used in the apparatus, including, air, gaseous hydrocarbons, water, connate water, liquid hydrocarbons, radioactive solutions, crude oils, and the like.

It is seen that the present apparatus avoids bending back or sharp bending of the extending ends of the sleeve, thereby preventing the initiation of high internal stresses within the sealing portion of the sleeve which is subject to adverse conditions of temperatures, pressure, and liquid contamination. By providing relatively large and protected sealing areas between the housing and end-plugs, the stresses within the sleeve material are minimized and core sample tests may be readily conducted at elevated temperatures and pressures.

The materials of construction may be varied to suit the conditions to which the apparatus is exposed and the limits of strength necessary for the various parts. In general, it is preferred that the housing, end-plates, plugs and filler discs be made of brass or some similar alloy. The studs and nuts are constructed of carbon steel. The flexible parts of the apparatus, such as filler discs 36 and sleeve 18, are constructed of any flexible, fluid-impermeable material which is resistant to the heat and fluids used in the apparatus and the fluids passed through the core specimen. The flexible parts may be constructed of such resins or plastics as acrylic resins, styrene polymers, styrene copolymers, vinyl chloride resins, and vinyl chloride acetate resins which are known for their chemical resistance to oil, acids, alkalis, bleaching agents, and alkali metal salt solutions. A preferred flexible material of construction for these parts is 45 Durometer A neoprene. Other materials such as nylon resins, tetrafluor-ethylene resins, polyethylene resins, known under the trade names of Zytel, Teflon and Alathon, respectively, and produced by Du Pont, may also be used. By reference to the Plastic Properties Chart appearing in Modern Plastics, Encyclopedia Issue 1955, vol. 33, No. 1A, published by Breskin, 1955, the selection of many other suitable materials of construction can be made.

Although the invention has been described in relation to the cooperation of the inner conical surfaces or openings 10 and 12 of housing 6 with external conical surfaces 48 and 50 of end-plugs 40, this is not to be interpreted as a limiting factor. Most core specimens are cylindrical in shape and the central portion of flexible sleeve 18 can be molded to accommodate such cores, or, for that matter, slightly irregular cores. However, since the sleeve is a flexible and yielding material, it can be reformed at the sealing surfaces to contact opposed conical sealing surfaces or surfaces having other configurations. Thus, the invention embraces the combination of any tubular, walled chamber with openings at opposite ends large enough to admit the core specimen and sleeve, said walled chamber having inwardly converging, infundibular sealing surfaces, and plug closures also having correspondnig, matching or registering infundibular sealing surfaces. The only requirements are that these sealing surfaces be devoid of such irregularities as would prevent attaining a good seal with the sleeve, and surfaces 10 and 12 must be substantially parallel to surfaces 48 and 50 so that uniform pressure is placed on the sleeve ends upon forcing the end-plugs therein.

What is claimed is:

1. A holder for the fluid pressure treatment of porous specimens comprising, in combination, an elongated tubular member having openings at each end thereof communicating with an inner chamber defined by the walls of said member, said openings having inwardly converging infundibular sealing surfaces, a flexible open-ended sleeve within said inner chamber and spaced from the walls thereof, the open ends of said sleeve extending in juxtaposition with said sealing surfaces, means within said sleeve to provide a specimen space therein, a pair of plug closures within said openings, said plug closures having inwardly converging infundibular sealing surfaces substantially parallel to the sealing surfaces of said tubular member and extending within the open ends of said flexible member, means for holding said plug closures against the inside open ends of said flexible sleeve to compress said sleeve ends against the sealing surfaces of said tubular member, means for introducing fluid pressure into the space between the outer wall of said sleeve and the inner walls of said chamber, and means for introducing fluid pressure through said specimen space.

2. A porous specimen holder in accordance with claim 1 in which said means within said sleeve to provide a specimen space comprises resilient sealing means positioned transverse the inside of said sleeve at each end of said specimen space and against the inner surfaces of said plug closures.

3. A porous specimen holder in accordance with claim 2 in which a pair of fluid-dispersing discs are positioned in sealed relationship against the inside surfaces of said resilient sealing means within said sleeve at each end of said specimen space, said discs having a plurality of radial grooves extending across their inner surfaces adjacent said specimen space, and a centrally located aperture communicating with said grooves and with said means for introducing fluid into said specimen space.

4. In a core-holder for making fluid pressure-flow measurements of porous core specimens, the combination comprising, an elongated flexible sleeve having open ends, a pair of transverse, slotted, fluid-dispersing discs held in circumferentially sealed and spaced relationship within said sleeve, said fluid-dispersing discs having flat outer surfaces and opposed inner surfaces to define a core-holding space within said sleeve, a pair of flexible filler discs within said sleeve and against the outside flat surfaces of said fluid-dispersing discs, a closure plug within each open end of said sleeve and filler disc, said closure plugs having corresponding, inwardly converging, infundibular, straight sealing surfaces against the inside surfaces of the extended ends of said sleeve, said closure plugs having rounded outer ends, a tubular housing having a passageway through a side wall thereof and openings in each end, said housing surrounding said sleeve and having its inner wall spaced from the outside of said sleeve to provide an annular space into which said passageway communicates, said openings of said housing also having inwardly converging, infundibular, straight, sealing surfaces substantially parallel to and spaced from the aforesaid sealing surfaces of said closure plugs, the rounded outer ends of said closure plugs extending beyond the ends of said housing, a pair of spaced pressure plates having central openings with inner chamfered edges which register against the extending, rounded, outer ends of said closure plugs, said closure plugs, filler discs, and fluid-dispersing discs having fluid passageways which register one to the other and communicate with said core-holding space, and means for forcing said pressure plates uniformly against said closure plugs so that said sealing surfaces are pressed against the extended ends of said sleeve.

References Cited in the file of this patent

UNITED STATES PATENTS

| | | |
|---|---|---|
| 2,465,948 | Welge | Mar. 29, 1949 |
| 2,618,151 | Leas | Nov. 18, 1952 |
| 2,705,418 | Reichertz et al. | Apr. 5, 1955 |